United States Patent
Masudaya (10) Patent No.: US 6,850,148 B2
(45) Date of Patent: Feb. 1, 2005

(54) PASSIVE ENTRY WITH ANTI-THEFT FUNCTION

(75) Inventor: Hideki Masudaya, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 110 days.

(21) Appl. No.: 10/184,401

(22) Filed: Jun. 27, 2002

(65) Prior Publication Data

US 2003/0001723 A1 Jan. 2, 2003

(30) Foreign Application Priority Data

Jun. 29, 2001 (JP) .................................... 2001-198771

(51) Int. Cl.$^7$ ................................................ H04B 1/00
(52) U.S. Cl. ..................................... 340/5.61; 340/5.72
(58) Field of Search .......................... 340/5.61, 5.62, 340/5.64, 5.72, 10.1, 10.2, 10.6, 426.25, 426.13, 426.35, 828.69, 825.72; 307/10.4, 10.5, 10.2

(56) References Cited

U.S. PATENT DOCUMENTS 5,983,347 A 11/1999 Schwegler et al.
6,208,239 B1 3/2001 Knepper et al.
6,577,227 B1 * 6/2003 Rohrl et al. ................ 340/5.62

FOREIGN PATENT DOCUMENTS

DE 40 20 445 1/1992
EP 1 004 726 5/2000
WO WO 01/25060 4/2001

* cited by examiner

Primary Examiner—Brian Zimmerman
Assistant Examiner—William Bangachon
(74) Attorney, Agent, or Firm—Brinks Hofer Gilson & Lione (57) ABSTRACT

In a passive entry comprising a car-mounted transmitter-receiver and one or more portable transmitter-receivers, the car-mounted transmitter-receiver generates a request signal, when any of the portable transmitter-receivers receives the request signal, an answer signal is transmitted in response to the request signal, and when the car-mounted transmitter-receiver receives the answer signal, the car door is locked or unlocked. The car-mounted transmitter-receiver has a timer for counting time from transmission of the request signal to reception of the answer signal, and when the answer signal is received, recognizes the answer signal as legal only when an elapsed-time value counted by the timer is within a valid elapsed-time value set in advance, and exercises control of a controlled apparatus, such as, e.g., locking and unlocking of the car door.

6 Claims, 5 Drawing Sheets

PASSIVE ENTRY WITH ANTI-THEFT FUNCTION

BACKGROUND OF THE INVENTION

1. Field of the Invention

The present invention relates to a passive entry having an anti-theft function, and more particularly to a passive entry having an anti-theft function for preventing damage of relay attack by use of plural repeaters so that elapsed time from transmission of a request signal to a car-mounted transmitter-receiver to reception of an answer signal is counted, and only when the counted time value is within a valid elapsed-time value, a car door is locked or unlocked.

2. Description of the Prior Art

Generally, a passive entry used with a car comprises a transmitter-receiver mounted in the car and one or more portable transmitter-receivers for performing bidirectional signal transmission with the car-mounted transmitter-receiver. In the passive entry, during bidirectional signal transmission, the car-mounted transmitter-receiver transmits a request signal by a low frequency carrier signal, and if, at a transmission timing of the request signal, the portable transmitter-receivers exist in the proximity of the car, that is, within a reach range of the low frequency carrier signal, the portable transmitter-receivers receive the request signal. At this time, the portable transmitter-receivers transmit an answer signal by a high frequency carrier signal in response to the received request signal, and when the car-mounted transmitter-receiver receives the answer signal, an apparatus mounted in the car, e.g., a door is automatically locked or unlocked by the car-mounted transmitter-receiver. That is, upon receiving a legal answer signal when the door is locked, the car-mounted transmitter-receiver automatically unlocks the door, and on the other hand, upon receiving a legal answer signal when the door is unlocked, it automatically locks the door.

According to the passive entry having such a function, when a person carrying a portable transmitter-receiver approaches a car, a car door can be automatically unlocked without having to operate the portable transmitter-receiver; on the other hand, when the person carrying the portable transmitter-receiver moves away from the car, the car door can be automatically locked without having to operate the portable transmitter-receiver.

In the existing passive entry, when unlocking the car door, the person carrying the portable transmitter-receiver has only to approach the car, and on the other hand, when locking the car door, the person carrying the portable transmitter-receiver has only to move away from the car. Therefore, the person takes no trouble to lock or unlock the car door by a key in hand or by operating the operation keys of the portable transmitter-receiver.

As described above, in the existing passive entry, when unlocking the car door, the person carrying the portable transmitter-receiver must approach the car. However, if repeaters are used to relay a low frequency carrier signal for transmitting a request signal and a high frequency carrier signal for transmitting an answer signal, the car door can be unlocked even if the person carrying the portable transmitter-receiver does not approach the car.

Figure 5:
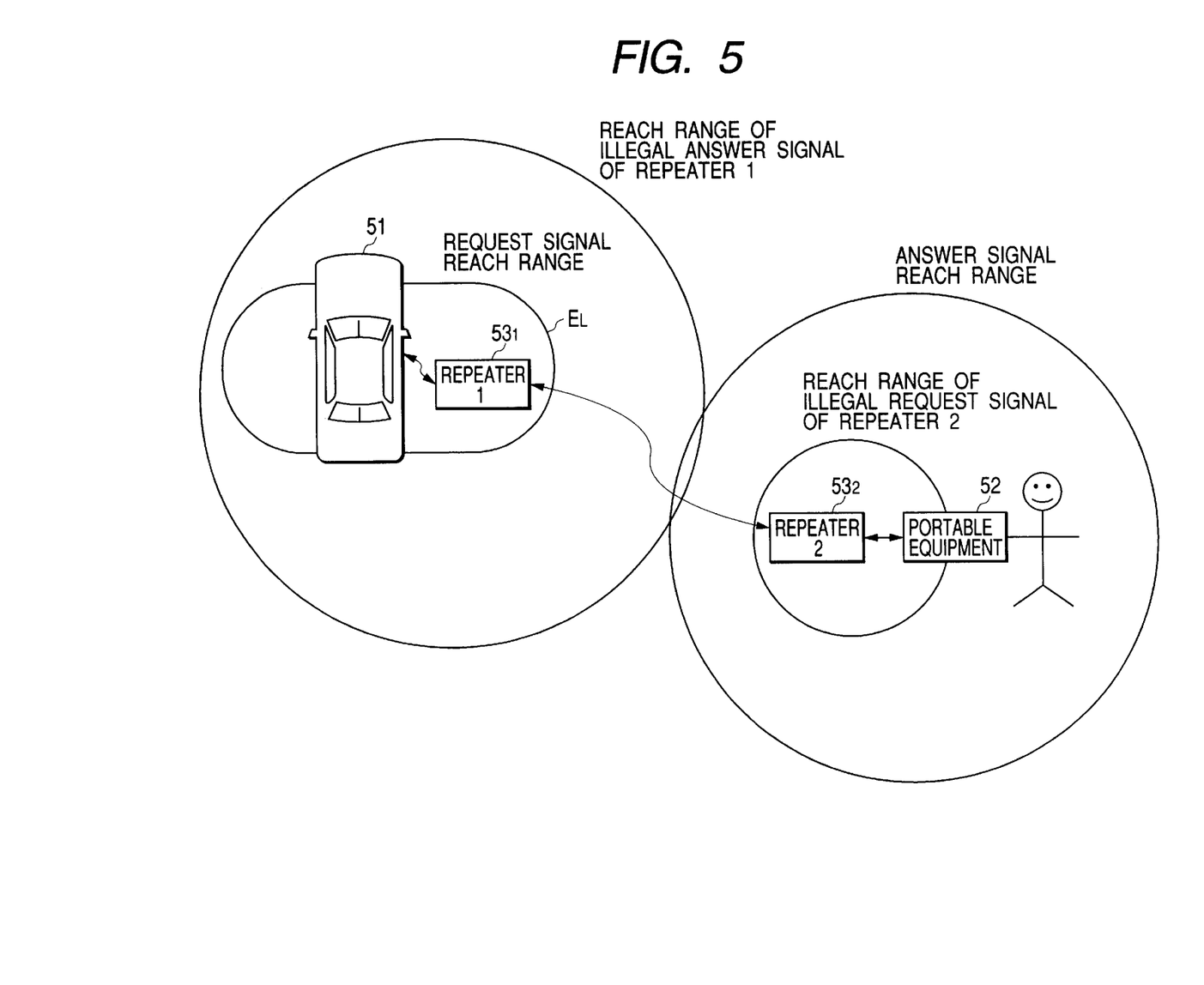
FIG. 5 is a diagram for explaining a state in which bidirectional communication is possible between a car-mounted transmitter-receiver and a portable transmitter-receiver if two repeaters are used when the portable transmitter-receiver is distant from a car.

FIG. 5 is a diagram for explaining a state in which bidirectional communication is possible between a car-mounted transmitter-receiver and a portable transmitter-receiver if two repeaters are used when the portable transmitter-receiver is distant from a car.

In the example shown in FIG. 5, since the owner (not provided with a reference numeral) of a car 51 having a portable transmitter-receiver 52 is considerably distant from the car 51, the portable transmitter-receiver 52 is placed outside a reach range $E_L$ of a request signal from a car-mounted transmitter-receiver (not provided with a reference numeral) mounted on the car 51. On the other hand, since the car-mounted transmitter-receiver is placed outside a reach range of an answer signal from the portable transmitter-receiver 52, communication between the car-mounted transmitter-receiver and the portable transmitter-receiver 52 is impossible in this state.

In the example shown in FIG. 5, a first repeater $53_1$ and a second repeater $53_2$ intervene between the car-mounted transmitter-receiver (not provided with a reference numeral) mounted in the car 51 and the portable transmitter-receiver 52 distant from the car so that a request signal and an answer signal can be transmitted between the car-mounted transmitter-receiver and the portable transmitter-receiver 52. The first repeater $53_1$ is placed within a reach range $E_L$ of a low frequency carrier signal (request signal) transmitted by the car-mounted transmitter-receiver and the second relay $53_2$ is placed within a reach range $E_L$ of a low frequency carrier signal (request signal) transmitted by the portable transmitter-receiver 52. Upon receiving the low frequency carrier signal (request signal) from the car-mounted transmitter-receiver, the first repeater $53_1$ converts the low frequency carrier signal to a high frequency carrier signal to transmit the request signal to the second repeater $53_2$. Upon receiving the request signal transmitted by the high frequency carrier signal, the second repeater $53_2$ converts the high frequency carrier signal to a low frequency carrier signal and transmits the request signal to the portable transmitter-receiver 52 by the low frequency carrier signal so that the request signal is transmitted to the portable transmitter-receiver 52. On the other hand, upon receiving a high frequency carrier signal (answer signal) from the portable transmitter-receiver 52, the second repeater $53_2$ amplifies the received high frequency carrier signal and then transmits the answer signal to the first repeater $53_1$ by the high frequency carrier signal. Upon receiving the answer signal transmitted by the high frequency carrier signal, the first repeater $53_1$ amplifies the received high frequency carrier signal and then transmits the answer signal to the car-mounted transmitter-receiver by the high frequency carrier signal so that the answer signal is transmitted to the car-mounted transmitter-receiver.

In the existing passive entry, as shown in FIG. 5, if the repeaters $53_1$ and $53_2$ are used, since the reach range $E_L$ of the low frequency carrier signal (request signal), and in some cases, a reach range of the high frequency carrier signal (answer signal) can be substantially expanded, the owner of the car 51 carrying the portable transmitter-receiver 52 can unlock a car door even if he is considerably distant from the car 51. The above-described act is used to unlock a car door by malicious people without permission of a car owner and is called relay attack.

The existing passive entry has the risk of a car door being unlocked using the repeaters $53_1$ and $53_2$ by malicious people, that is, undergoing relay attack.

SUMMARY OF THE INVENTION

The present invention has been made in view of such a technical background and provides a passive entry having an anti-theft function for disabling operations on a car door that are performed at positions considerably distant from the car by use of repeaters.

In order to achieve the above object, the passive entry having the anti-theft function of the present invention comprises a car-mounted transmitter-receiver mounted in a car and one or more portable transmitter-receivers. In the passive entry, the car-mounted transmitter-receiver generates a request signal; upon receiving the request signal, any of the portable transmitter-receivers transmits an answer signal in response to the request signal; and upon receiving the answer signal, the car-mounted transmitter-receiver controls an apparatus mounted in the car, such as car door locking and unlocking. The car-mounted transmitter-receiver has a timer for counting time from transmission of the request signal to reception of the answer signal and has a means for recognizing the received answer signal as legal only when an elapsed-time value counted by the timer is within a valid elapsed-time value set in advance.

According to the above-described means, the car-mounted transmitter-receiver is provided with a timer for counting time from transmission of a request signal to reception of an answer signal, and only when an elapsed-time value counted by the timer is within a valid elapsed-time value set in advance when the answer signal is received, the received answer signal is recognized as a legal answer signal. In the case where repeaters intervene between the car-mounted transmitter-receiver and a portable transmitter-receiver, a counted elapsed time from the transmission of a request signal from the car-mounted transmitter-receiver, through reception of the request signal in a portable transmitter-receiver and transmission of an answer signal in response to the request signal from the portable transmitter-receiver, to reception of the answer signal in the car-mounted transmitter-receiver is not within a valid elapsed-time value set in advance because of delay of relay signals by the repeaters. Therefore, even if the car-mounted transmitter-receiver receives the answer signal, it judges the answer signal to be illegal and nullifies various functions to be subsequently executed, so that control of an apparatus mounted in the car such as car door locking and unlocking is not performed, and the car can be prevented from being stolen by relay attack.

DESCRIPTION OF THE PREFERRED EMBODIMENTS

Hereinafter, embodiments of the present invention will be described with reference to the accompanying drawings.

Figure 1:
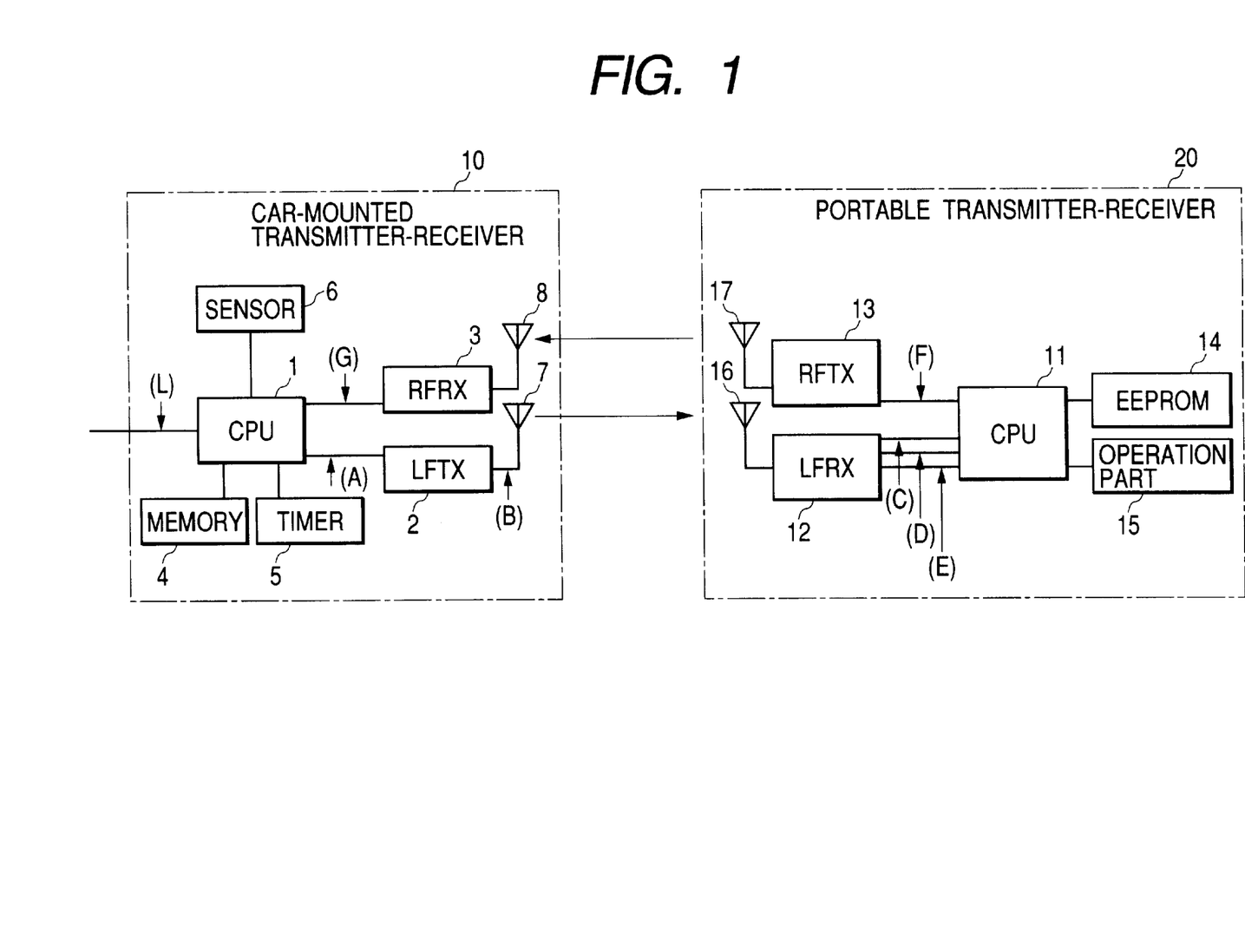
FIG. 1 shows an embodiment of a passive entry having an anti-theft function of the present invention, and is a block diagram showing a configuration of main portions thereof.

FIG. 1 shows a first embodiment of a passive entry having an anti-theft function of the present invention, and is a block diagram showing a configuration of main portions thereof. It shows an example of using one portable transmitter-receiver.

As shown in FIG. 1, a passive entry of the first embodiment comprises a car-mounted transmitter-receiver 10 and a portable transmitter-receiver 20. In this case, the car-mounted transmitter-receiver 10 comprises: a controller (CPU) 1; a low frequency signal transmitter (LFTX) 2; a high frequency signal receiver (RFRX) 3; a storage (memory) 4; a timer 5; a sensor 6; a low frequency transmitting antenna 7; and a high frequency receiving antenna 8. The portable transmitter-receiver 20 comprises: a controller (CPU) 11; a low frequency signal receiver (LFRX) 12; a high frequency signal transmitter (RFTX) 13; a storage 14 composed of EEPROM and the like; an operation part 15; a low frequency receiving antenna 16; and a high frequency transmitting antenna 17.

In the car-mounted transmitter-receiver 10, the controller 1 is connected to an input end of the low frequency signal transmitter 2, an input end of the high frequency signal receiver 3, the storage 4, the timer 5, and the sensor 6. The low frequency signal transmitter 2 has an output end thereof connected to the low frequency transmitting antenna 7, and the high frequency signal receiver 3 has an input end thereof connected to the high frequency receiving antenna 8. In this case, the controller 1 or the storage 4 has a valid elapsed-time value described later stored as a program or data wherein the valid elapsed-time value is used to determine whether an answer signal is legal or illegal due to relay attack. In the portable transmitter-receiver 20, the controller 11 is connected to an output end of the low frequency signal receiver 12, an input end of the high frequency signal transmitter 13, the storage 14, and the operation part 15. The low frequency signal receiver 12 has an input end thereof connected to the low frequency receiving antenna 16 and the high frequency signal transmitter 13 has an output end thereof connected to the high frequency transmitting antenna 17.

Figure 2:
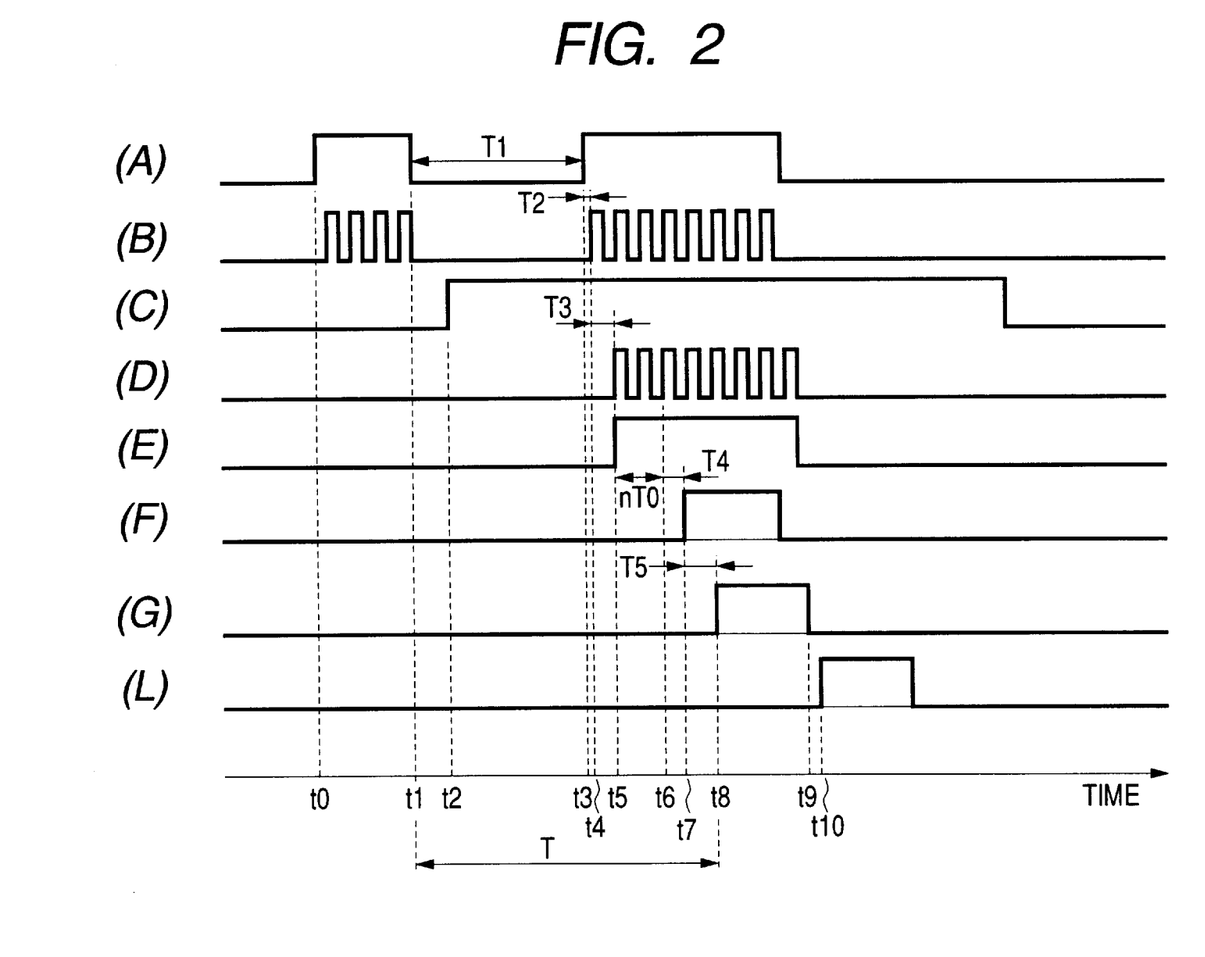
FIG. 2 is a diagram for illustrating the states of signals obtained in different parts of the passive entry shown in FIG. 1 when no relay attack is made.

FIG. 2 is a diagram for illustrating the states of signals obtained in different parts of the passive entry shown in FIG. 1 when no relay attack is made.

In FIG. 2, the first row (A) denotes a control signal supplied from the controller 1 to the low frequency signal transmitter 2 in the car-mounted transmitter-receiver 10; the second row (B), a low frequency carrier signal outputted from the low frequency signal transmitter 2 in the car-mounted transmitter-receiver 10; the third row (C), an activation signal supplied from the low frequency signal receiver 12 to the controller 11 in the portable transmitter-receiver 20; the fourth row (D), a low frequency carrier signal supplied from the low frequency signal receiver 12 to the controller 11 in the portable transmitter-receiver 20; the fifth row (E), low frequency data supplied from the low frequency signal receiver 12 to the controller 11 in the portable transmitter-receiver 20; the sixth row (F), a control signal supplied from the controller 11 to the high frequency signal transmitter 13 in the portable transmitter-receiver 20; the seventh row (G), a control signal supplied from the high frequency signal receiver 3 to the controller 1 in the car-mounted transmitter-receiver 10; and the eighth row (L), a control signal supplied from the controller 1 to a controlled apparatus. (A) to (L) indicate signals in the positions of symbols A to L shown in FIG. 1.

The operation of the passive entry when no relay attack is made will be described with reference to FIG. 2 also.

In the car-mounted transmitter-receiver 10, at time t0, a control signal (wakeup signal) supplied from the controller 1 to the low frequency signal transmitter 2 rises {FIG. 2(A)}, and a low frequency carrier signal is outputted from the low frequency signal transmitter 2 {FIG. 2(B)} and transmitted from the low frequency transmitting antenna 7. At time t1, the wakeup signal falls {FIG. 2(A)}, and the output and transmission of the low frequency carrier signal are stopped {FIG. 2(B)}.

In the portable transmitter-receiver 20, at time t2, the low frequency carrier signal is received in the low frequency signal receiver 12 through the low frequency receiving antenna 16, and an activation signal supplied from the low frequency signal receiver 12 to the controller 11 rises {FIG. 2(C)}.

In the car-mounted transmitter-receiver 10, at time t3 at the elapse of time T1 preset by the controller 1 from time t1, a control signal supplied from the controller 1 to the low frequency signal transmitter 2 rises {FIG. 2(A)}, and at time t4 at the elapse of a short time T2 required for signal transmission and the like from time t3, a low frequency carrier signal (request signal) is outputted from the low frequency signal transmitter 2 {FIG. 2(B)} and transmitted from the low frequency transmitting antenna 7.

In the portable transmitter-receiver 20, at time t5 at the elapse of a small time T3 required for reception from time t4, a request signal is received in the low frequency signal receiver 12 through the low frequency receiving antenna 16, and the request signal is supplied from the low frequency signal receiver 12 to the controller 11 {FIG. 2(D)}. At the same time, low frequency data supplied from the low frequency signal receiver 12 to the controller 11 rises {FIG. 2(E)}. Next, at time t7 at the elapse of a small time T4 required for transmission from the time t6 at the elapse of preset time nT0 from time t5, in response to the request signal, a control signal (answer signal) supplied from the controller 11 to the high frequency signal transmitter 13 rises {FIG. 2 (F)}. The high frequency signal transmitter 13 forms a high frequency carrier signal including the supplied answer signal and transmits it through the high frequency transmitting antenna 17.

Next, in the car-mounted transmitter-receiver 10, at time t8 at the elapse of a short time T5 required for reception from time t7, the high frequency carrier signal (answer signal) is received in the high frequency signal receiver 3 through the high frequency receiving antenna 8, and the answer signal is supplied from the high frequency signal receiver 3 to the controller 1 {FIG. 2(G)}. At time t9, the supply of the answer signal from the high frequency signal receiver 3 to the controller 1 is stopped {FIG. 2(G)}. The controller 1 determines whether the answer signal is legal or illegal, and upon determining that it is a legal answer signal, supplies a control signal to the controlled apparatus {FIG. 2(L)}.

When these operations are performed, the controller 1 of the car-mounted transmitter-receiver 10 controls the timer 5 to count elapsed time T (T=T1+T2+T3+nT0+T4+T5) from time t1, which is the falling point of the wakeup signal, to time t8, which is the point of supplying the answer signal to the controller 1, and obtains the elapsed-time value. The controller 1 locks or unlocks a car door only when the elapsed-time value is within a valid elapsed-time value set in advance. As the valid elapsed-time value, a theoretical elapsed time T plus a slight margin time $T_y$, usually 300 to 350 $\mu$s, is used.

Although time T1 may be fixed in the above processing, if it is changed for each transmission of a request signal, such an illegal act that the request signal is copied for use can be prevented. Although time nT0 may be fixed, it may be set as follows. That is, one cycle T0 of pulse wave of the request signal is used as a base and is multiplied by a given number n to produce time nT0, which is decided by the controller 1 of the car-mounted transmitter-receiver 10 for each transmission of the request signal. The time nT0 is transmitted, included in the request signal, and the controller 11 transmits an answer signal after the indicated time nT0 elapses. This method is also effective for preventing illegal acts.

Figure 3:
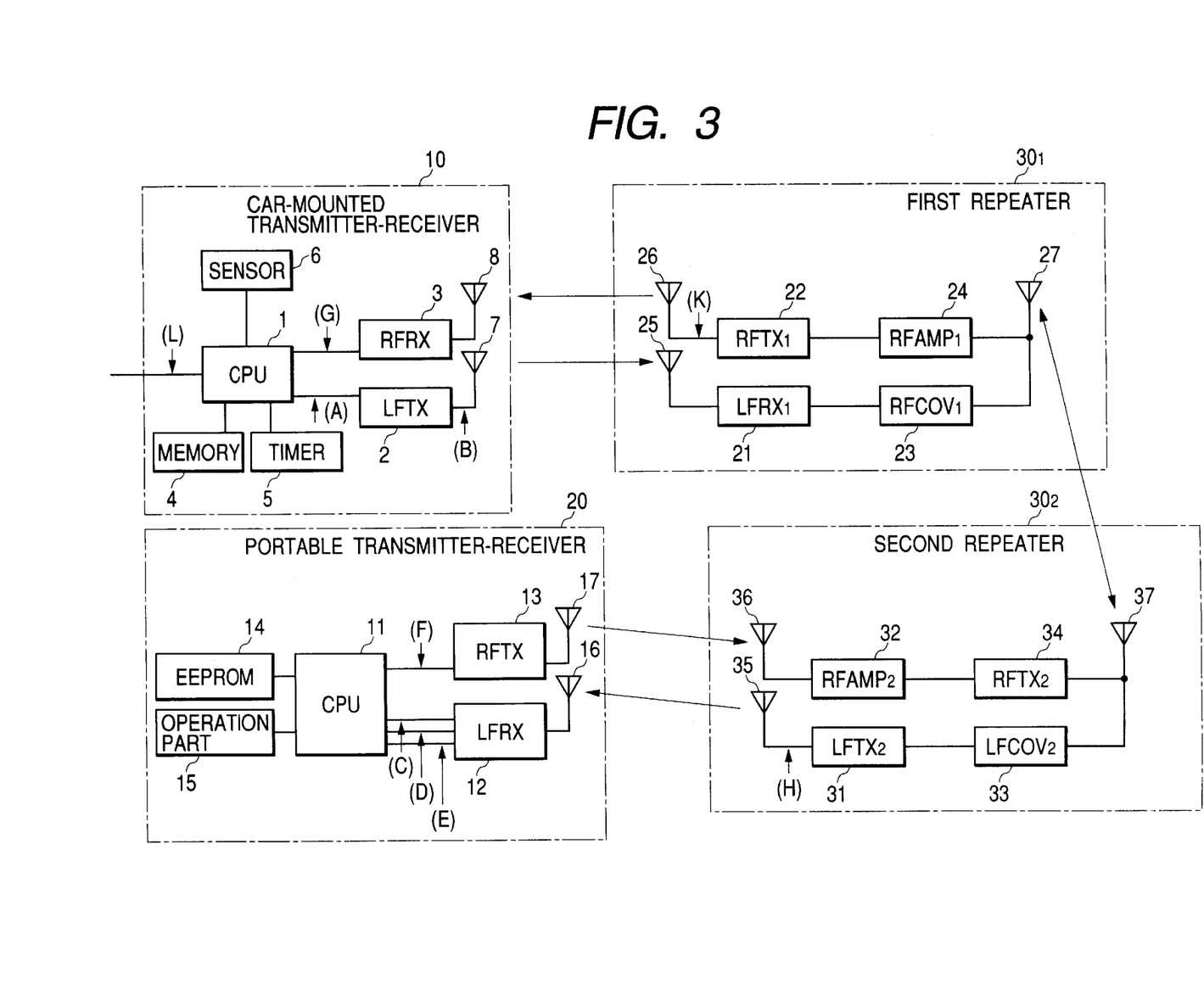
FIG. 3 is a block diagram showing a configuration of main portions of a passive entry having an anti-theft function of the present invention in the case where relay attack is made.

FIG. 3 shows a passive entry having an anti-theft function of the present invention in the case where relay attack is made, and is a block diagram showing a configuration of main portions thereof. In FIG. 3, one portable transmitter-receiver is used and two repeaters intervene between the car-mounted transmitter-receiver 10 and the portable transmitter-receiver 20.

It is understood that components in FIG. 3 that are identical to components in FIG. 1 are identified by the same reference numerals.

As shown in FIG. 3, in the case where relay attack is made, the passive entry comprises the car-mounted transmitter-receiver 10, the portable transmitter-receiver 20, and a first repeater $30_1$, and a second repeater $30_2$. In this case, the car-mounted transmitter-receiver 10 is identical with the car-mounted transmitter-receiver 10 shown in FIG. 1. The portable transmitter-receiver 20 is identical with the portable transmitter-receiver 20 shown in FIG. 1.

In the first repeater $30_1$, a low frequency signal receiver 21 is connected to a low frequency receiving antenna 25 at an input end thereof and to an input end of a frequency converting part 23 at an output end thereof. A high frequency signal transmitter 22 is connected to an output end of a high frequency signal amplifier 24 and an input end thereof and a high frequency transmitting antenna 26 at an output end thereof. The frequency converting part 23 is connected to a high frequency transmitting/receiving antenna 27 at an output end thereof, and the high frequency signal amplifier 24 is connected to the high frequency transmitting/receiving antenna 27 at an input end thereof. In the second repeater $30_2$, a low frequency signal transmitter 31 is connected to an output end of a frequency converting part 33 at an input end thereof and a low frequency transmitting antenna 35 at an output end thereof. A high frequency signal amplifier 32 is connected to a high frequency receiving antenna 36 at an input end thereof and a high frequency signal transmitter 34 at an output end thereof. The frequency converting part 33 is connected to a high frequency transmitting/receiving antenna 37 at an input end thereof and the high frequency signal transmitter 34 is connected to the high frequency transmitting/receiving antenna 37 at an output end thereof.

Figure 4:
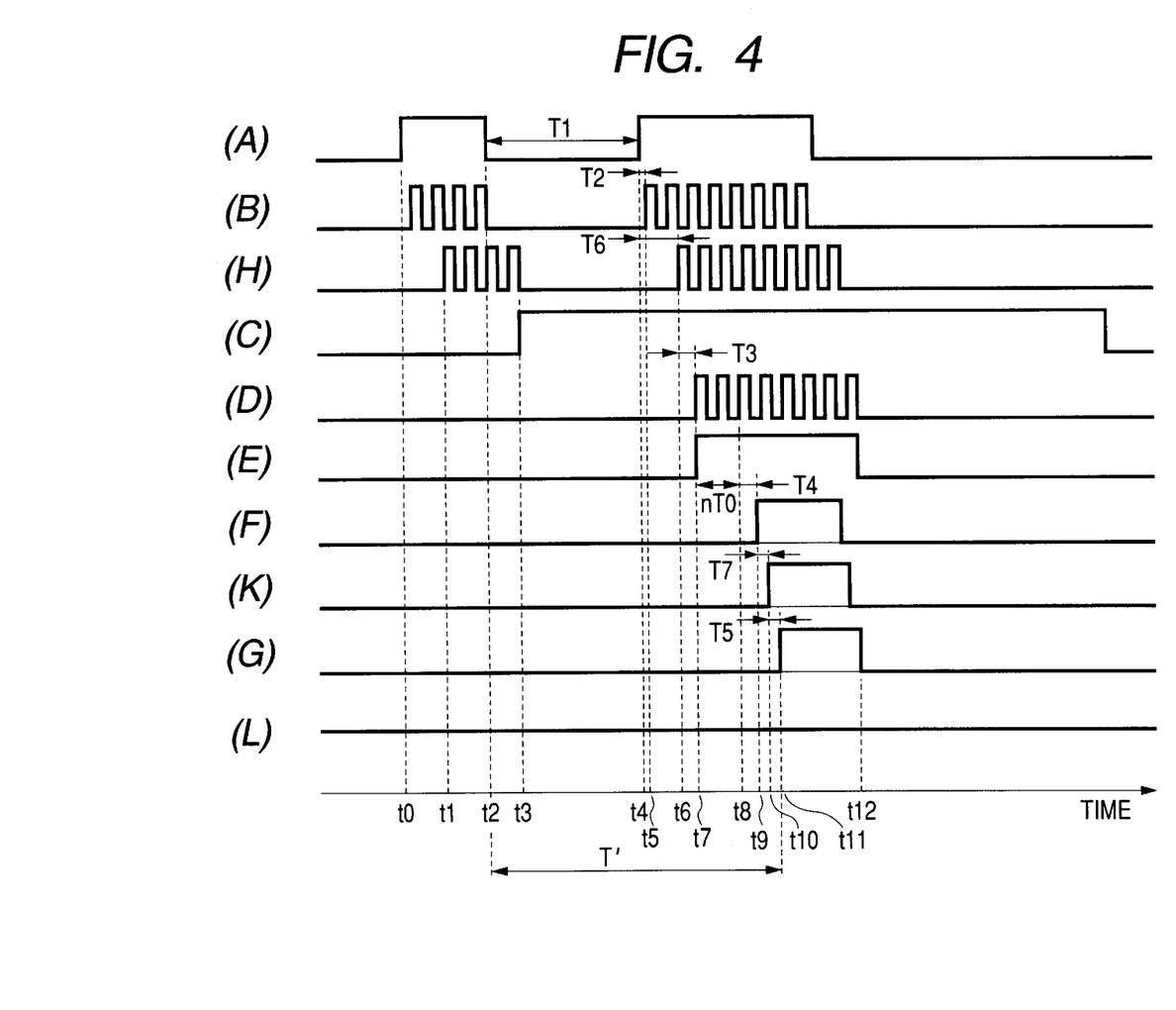
FIG. 4 is a diagram for illustrating the states of signals obtained in different parts of the passive entry shown in FIG. 3.

FIG. 4 is a diagram for illustrating the states of signals obtained in different parts of the passive entry shown in FIG. 3.

In FIG. 4, the first row (A) denotes a control signal supplied from the controller 1 to the low frequency signal transmitter 2 in the car-mounted transmitter-receiver 10; the second row (B), a low frequency carrier signal outputted from the low frequency signal transmitter 2 in the car-mounted transmitter-receiver 10; the third row (H), a low frequency carrier signal supplied from the low frequency signal transmitter 31 to the low frequency transmitting antenna 35 in the second repeater $30_2$; the fourth row (C), an activation signal supplied from the low frequency signal receiver 12 to the controller 11 in the portable transmitter-receiver 20; the fifth row (D), a low frequency carrier signal supplied from the low frequency signal receiver 12 to the controller 11 in the portable transmitter-receiver 20; the sixth row (E), low frequency data supplied from the low frequency signal receiver 12 to the controller 11 in the portable transmitter-receiver 20; the seventh row (F), a control signal supplied from the controller 11 to the high frequency signal transmitter 13 in the portable transmitter-receiver 20; the eighth row (K), an illegal control signal supplied from the high frequency signal transmitter 22 to the high frequency signal transmitter 26 in the first repeater $30_1$; the ninth row (G), a control signal supplied from the high frequency signal receiver 3 to the controller 1 in the car-mounted transmitter-receiver 10; and the tenth (L), a control signal supplied from the controller 1 to a controlled apparatus. (A) to (L) indicate signals in the positions of symbols A to L shown in FIG. 3.

The operation of the passive entry of a second embodiment that has the foregoing configuration will be described with reference to FIG. 4 also.

In the car-mounted transmitter-receiver 10, at time t0, a control signal (wakeup signal) supplied from the controller 1 to the low frequency signal transmitter 2 rises {FIG. 4(A)}, and a low frequency carrier signal is outputted from the low frequency signal transmitter 2 {FIG. 4(B)} and transmitted from the low frequency transmitting antenna 7. Thereafter, upon receiving the low frequency carrier signal through the low frequency receiving antenna 25 in the low frequency signal receiver 21, the first repeater $30_1$ subjects the received low frequency carrier signal to frequency conversion to a high frequency carrier signal in the frequency converting part 23 and transmits the obtained high frequency carrier signal through the high frequency transmitting/receiving antenna 27. Upon receiving the high frequency carrier signal in the high frequency transmitting/receiving antenna 37, the second repeater $30_2$ subjects the received high frequency carrier signal to frequency conversion to a low frequency carrier signal in the frequency converting part 33 and supplies the obtained low frequency carrier signal to the low frequency signal transmitter 31.

In the second repeater $30_2$, at time t1, a low frequency carrier signal is outputted from the low frequency signal transmitter 31 {FIG. 4(H)} and transmitted through the low frequency transmitting antenna 35.

In the car-mounted transmitter-receiver 10, at time t2, the wakeup signal falls {FIG. 4(A)} and the output and transmission of the low frequency carrier signal are stopped {FIG. 4(B)}.

In the portable transmitter-receiver 20, at time t3, an illegal low frequency carrier signal is received in the low frequency signal receiver 12 through the low frequency receiving antenna 16, and an activation signal supplied from the low frequency signal receiver 12 to the controller 11 rises {FIG. 4(C)}.

In the car-mounted transmitter-receiver 10, at time t4 at the elapse of the time T1 from time t2, a control signal supplied from the controller 1 to the low frequency signal transmitter 2 rises {FIG. 4(A)}, and at time t5 at the elapse of the short time T2 from time t4, a low frequency carrier signal (request signal) is outputted from the low frequency signal transmitter 2 {FIG. 4 (B)} and transmitted from the low frequency transmitting antenna 7. Thereafter, upon receiving the low frequency carrier signal (request signal) through the low frequency receiving antenna 25 in the low frequency signal receiver 21, the first repeater $30_1$ subjects the received low frequency carrier signal (request signal) to frequency conversion to a high frequency carrier signal in the frequency converting part 23 and transmits the obtained high frequency carrier signal (request signal) through the high frequency transmitting/receiving antenna 27. Upon receiving the high frequency carrier signal (request signal) in the high frequency transmitting/receiving antenna 37, the second repeater $30_2$ subjects the received high frequency carrier signal (request signal) to frequency conversion to a low frequency carrier signal (request signal) in the frequency converting part 33 and supplies the obtained low frequency carrier signal (request signal) to the low frequency signal transmitter 31.

In the second repeater $30_2$, at time t6 at the elapse of time T6 from time t5, an illegal low frequency carrier signal (illegal request signal) is outputted from the low frequency signal transmitter 31 {FIG. 4(H)} and transmitted from the low frequency transmitting antenna 35.

The time T6 is time required for signal processing and the like in the first repeater $30_1$ and the second repeater $30_2$ after the car-mounted transmitter-receiver 10 transmits the low frequency carrier signal (request signal) until the second repeater $30_2$ transmits the illegal low frequency carrier signal (illegal request signal).

In the portable transmitter-receiver 20, at time t7 at the elapse of the short time T3 from time t6, the low frequency carrier signal (request signal) is received in the low frequency signal receiver 12 through the low frequency receiving antenna 16, the request signal is supplied from the low frequency signal receiver 12 to the controller 11 {FIG. 4(D)}, and at the same time, low frequency data supplied from the low frequency signal receiver 12 to the controller 11 rises {FIG. 4(E)}.

At time t9 at the elapse of time T4 after the elapse of the time nT0 from the time t7, in response to the request signal, a control signal (answer signal) supplied from the control 11 to the high frequency signal transmitter 13 rises {FIG. 4(F)}. The high frequency signal transmitter 13 forms a high frequency carrier signal including the supplied answer signal and transmits it through the high frequency transmitting antenna 17. Thereafter, upon receiving the high frequency carrier signal (answer signal) through the high frequency receiving antenna 36, the second repeater $30_2$ amplifies the received high frequency carrier signal (answer signal) in the high frequency signal amplifier 32 and transmits the high frequency carrier signal (answer signal) by the high frequency signal transmitter 34 from the high frequency transmitting/receiving antenna 37. Upon receiving the high frequency carrier signal (answer signal) through the high frequency transmitting/receiving antenna 27, the first repeater $30_1$ supplies the received high frequency carrier signal (answer signal) to the high frequency signal transmitter 22 in the high frequency signal amplifier 24.

In the first repeater $30_1$, at time t10 at the elapse of a short time T7 from time t9, an illegal high frequency carrier signal (illegal answer signal) is outputted from the high frequency signal transmitter 22 {FIG. 4(K)} and transmitted from the high frequency transmitting antenna 36.

The time T7 is time required for signal processing and the like in the first repeater $30_1$ and the second repeater $30_2$ after the portable transmitter-receiver 20 transmits the high frequency carrier signal (answer signal) until the first repeater $30_1$ transmits the illegal low frequency carrier signal (illegal answer signal).

In the car-mounted transmitter-receiver 10, at time t11 at the elapse of the short time T5 from time t10, the illegal high frequency carrier signal (illegal answer signal) is received in the high frequency signal receiver 3 through the high frequency receiving antenna 8, and the illegal answer signal is supplied from the high frequency signal receiver 3 to the controller 1 {FIG. 4(G)}. At time t12, the supply of the illegal answer signal from the high frequency signal receiver 3 to the controller 1 is stopped {FIG. 4(G)}.

When these operations are performed, the controller 1 of the car-mounted transmitter-receiver 10 controls the timer 5 to count elapsed time T' (T'=T1+T2+T6+T3+T4+nT0+T7+T5) from time t2, which is the falling point of the wakeup signal, to time t12, which is the point of supplying the answer signal to the controller 1, and obtains the elapsed-time value. The elapsed time T' is compared with the elapsed time T (T=T1+nT0+T4+T5) obtained when no relay attack is made as shown in FIG. 2. The elapsed time T' is longer by time $T_N$ ($T_N$=T6+T3+T7), which is usually about 200 μsec. The elapsed-time value of the elapsed time T' obtained by the controller 1 exceeds the valid elapsed-time value set in advance.

Therefore, from the fact that the elapsed time T' exceeds the valid elapsed-time value, the controller 1 determines that the received answer signal is an illegal answer signal due to relay attack, and ignores all subsequently received signals not to generate control signals to the controlled apparatus {FIG. 4(L)}.

As has been described above, according to the passive entry of this embodiment, only when a request signal and an answer signal are legally transmitted directly between the car-mounted transmitter-receiver 10 and the portable transmitter-receiver 20, the car-mounted transmitter-receiver 10 locks or unlocks the car door; on the other hand, when the repeaters $30_1$ and $30_2$ intervene to transmit a request signal and an answer signal between the car-mounted transmitter-receiver 10 and the portable transmitter-receiver 20, control of a controlled apparatus such as car door locking and unlocking is not exercised by the car-mounted transmitter-receiver 10. As a result, car theft by relay attack can be prevented.

Although only one portable transmitter-receiver 20 is used in the above-described embodiments, the number of portable transmitter-receivers 20 usable in the passive entry of the present invention is not limited to one and may be optionally two or more.

Request signals may be transmitted whether continuously or intermittently.

Controlled apparatuses may be a car door, an engine starter, and other apparatuses.

The controller 1, after counting an elapsed time T', determines whether an answer signal is legal or illegal. Alternatively, the controller 1 may discontinue subsequent processing at the moment when the timer 5 exceeds a valid elapsed-time value.

The passive entry may be targeted for car door locking/unlocking, anti-theft apparatus start/stop, engine start/stop, air conditioner start/stop, and the like.

According to the present invention, a car-mounted transmitter-receiver is provided with a timer for counting time from transmission of a request signal to reception of an answer signal so that a car door is locked or unlocked only when an elapsed-time value counted by the timer is within a valid elapsed-time value set in advance when the answer signal is received. In the case where repeaters intervene between the car-mounted transmitter-receiver and a portable transmitter-receiver, a counted elapsed time from the transmission of a request signal from the car-mounted transmitter-receiver, through reception of the request signal in a portable transmitter-receiver and transmission of an answer signal in response to the request signal from the portable transmitter-receiver, to reception of the answer signal in the car-mounted transmitter-receiver is not within a valid elapsed-time value set in advance because of delay of relay signals by the repeaters. Therefore, even if the car-mounted transmitter-receiver receives the answer signal, it nullifies various functions to be subsequently executed, so that the car door is neither locked nor unlocked, providing the effect of preventing the car from being stolen by relay attack.

What is claimed is:

1. A passive entry having an anti-theft function which comprises a car-mounted transmitter-receiver mounted in a car and at least one portable transmitter-receiver and in which the car-mounted transmitter-receiver generates a wake-up signal and a request signal; upon receiving the request signal, any of the portable transmitter-receivers transmits an answer signal in response to the request signal; and upon receiving the answer signal, the car-mounted transmitter-receiver controls an apparatus mounted in the car, wherein the car-mounted transmitter-receiver has a timer to count time from transmission of the wake-up signal to reception of the answer signal, and wherein the car-mounted transmitter-receiver recognizes the received answer signal as legal only when an elapsed-time value counted by the timer is within a valid elapsed-time value set in advance, wherein the wake-up signal and the request signal are separated by a time interval therebetween, a value of the time interval being changed each time the request signal is transmitted, and the elapsed-time value is varied depending on the value of the time interval.

2. The passive entry having an anti-theft function according to claim 1, wherein the valid elapsed-time value is set based on an elapsed-time value counted from transmission of a wake-up signal by the car-mounted transmitter-receiver, through reception of the request signal in a portable transmitter-receiver within a reach range of the request signal and the transmission of an answer signal in response to the request signal, to reception of the answer signal in the car-mounted transmitter-receiver.

3. A passive entry having an anti-theft function which comprises a car-mounted transmitter-receiver and at least one portable transmitter-receiver, the car-mounted transmitter-receiver generating a signal, the signal having a wake-up portion and a request portion, having a time interval therebetween; upon receiving the request signal, at least one of the portable transmitter-receivers transmits an answer signal in response to the request signal after a specified time delay; and, upon receiving the answer signal, the car-mounted transmitter-receiver controls an apparatus mounted in the car, wherein the car-mounted transmitter-receiver has a timer to count time from transmission of the wake up signal to reception of the answer signal, and wherein the car-mounted transmitter-receiver recognizes the received answer signal as legal only when an elapsed-time value counted by the timer is within a valid elapsed-time value set in advance, and the time delay in the response to the received request signal is determined as an integer value N multiplied by the period of the wake up signal.

4. The passive entry of claim 3, wherein the value of N is determined by a characteristic of the signal transmitted by the transmitter-receiver.

5. The passive entry of claim 4, wherein the value of N changes each time a signal is transmitted by the transmitter-receiver.

6. The passive entry of claim 3, wherein the time interval changes each time a signal is transmitted by the transmitter-receiver.

* * * * *

UNITED STATES PATENT AND TRADEMARK OFFICE
CERTIFICATE OF CORRECTION

| | | |
|---|---|---|
| PATENT NO. | : 6,850,148 B2 | Page 1 of 1 |
| APPLICATION NO. | : 10/184401 | |
| DATED | : February 1, 2005 | |
| INVENTOR(S) | : Hideki Masudaya | |

It is certified that error appears in the above-identified patent and that said Letters Patent is hereby corrected as shown below:

<u>On the Title Page</u>

In column 1, line 1, under "U.S. PATENT DOCUMENTS", delete "Schwegler et al." and substitute --Brinkmeyer et al.-- in its place.

In column 1, line 2, under "U.S. PATENT DOCUMENTS", delete "Knepper et al." and substitute --Müller et al.-- in its place.

In column 2, line 1, delete "Rohrl et al." and substitute --Kirchlinde et al.-- in its place.

Signed and Sealed this

Twenty-seventh Day of November, 2007

JON W. DUDAS
*Director of the United States Patent and Trademark Office*